United States Patent [19]

Shimizu et al.

[11] 4,221,996
[45] Sep. 9, 1980

[54] HOISTING APPARATUS

[75] Inventors: Motoi Shimizu; Masaaki Miyazaki, both of Kamagaya; Seiji Oh-Higashi, Funabashi, all of Japan

[73] Assignee: Senoh Kabushiki Kaisha, Tokyo, Japan

[21] Appl. No.: 916,850

[22] Filed: Jun. 19, 1978

[51] Int. Cl.² .............................. H02P 1/22; H02P 1/40
[52] U.S. Cl. ........................................ 318/287; 318/289; 318/293; 318/447; 318/470; 318/473; 318/480; 318/484
[58] Field of Search ................ 318/447, 466, 468, 470, 318/471, 472, 473, 480, 484, 672, 287, 291, 293, 300, 289

[56] References Cited

U.S. PATENT DOCUMENTS

| 2,902,276 | 9/1959 | Purdy | 318/480 |
| 2,922,929 | 1/1960 | Cooper et al. | 318/480 |
| 2,962,647 | 11/1960 | Borenstein | 318/480 |
| 3,144,598 | 8/1964 | Merritt | 318/480 |
| 3,147,001 | 9/1964 | Purdy | 318/480 |
| 3,294,151 | 12/1966 | Hartley et al. | 318/484 |
| 4,081,729 | 3/1978 | Payne et al. | 318/480 |

Primary Examiner—J. V. Truhe
Assistant Examiner—Eugene S. Indyk
Attorney, Agent, or Firm—J. Harold Nissen

[57] ABSTRACT

A hoisting apparatus and a control circuit therefor comprising a reversible electric motor drivingly connected to a hoisting drum for hauling an object up and down. The control circuit includes first and second photosensitive elements each responsive to a light beam for initiating rotation of the electric motor in either direction and means for terminating rotation of the electric motor.

9 Claims, 6 Drawing Figures

HOISTING APPARATUS

BACKGROUND OF THE INVENTION

1. Field of the Invention

The invention relates to a hoisting apparatus operable in response to optical remote control for moving an object such as an athletic game goal or other objects up and down or from a first to a second position.

2. Description of the Prior Art

In playing a ball game in a gymnasium, it is often necessary to remove the ball game goals and nets for other types of ball games out of the ball game zone. This is especially true for a basketball goal which is hung down from the ceiling of the gymnasium. In view of the above and other considerations, several systems have been proposed which include remote control means for permitting upward and downward movement of the basketball goal. However, such prior art systems have been found to be disadvantageous as they require a control board and wire cords connecting the control means and result in a system which is expensive and difficult to install.

Accordingly, a need has been recognized for a new and improved hoisting apparatus for hauling the basketball goal up and down.

SUMMARY OF THE INVENTION

Thus, it is a general object of the present invention to provide a new and improved hoisting apparatus which avoids or eliminates many of the limitations and drawbacks inherent in previous designs.

Another object of the present invention is to provide a hoisting apparatus which is relatively simple and inexpensive in design. The present invention eliminates the requirement for the control board and wire cords employed in conventional designs.

Still another object of the present invention is to provide a hoisting apparatus which is easy to install and controllable in a position where the operator can view the object.

In accordance with the present invention, there is provided a hoisting apparatus for hauling up and down an object which comprises a reversible electric motor drivingly connected to a hoisting drum for winding and unwinding a wire rope having its free end connected to the object. The hoisting apparatus also comprises a control circuit which includes first and second photosensitive elements each operated responsive to a light beam for initiating operation of respective first and second switching means so as to connect the electric motor to a source of power thereby rotating it in either direction. Such operation of the switching means is deferred a predetermined time after the photosensitive element is operated and also is terminated when the object reaches a predetermined position. The operation of the switching means is held until the object reaches the predetermined position.

Other objects and advantages of the present invention will become apparent to those skilled in the art from a consideration of the following detailed description of one exemplary embodiment of the present invention.

BRIEF DESCRIPTION OF THE DRAWINGS

The following description of the present invention is had in conjunction with the accompanying drawings, in which like reference characters refer to the same or corresponding parts, and wherein.

DETAILED DESCRIPTION OF THE INVENTION

Reference will now be made to the drawings which depicts illustratively in more detail the significant portions of the hoisting apparatus of the present invention.

Figure 1:
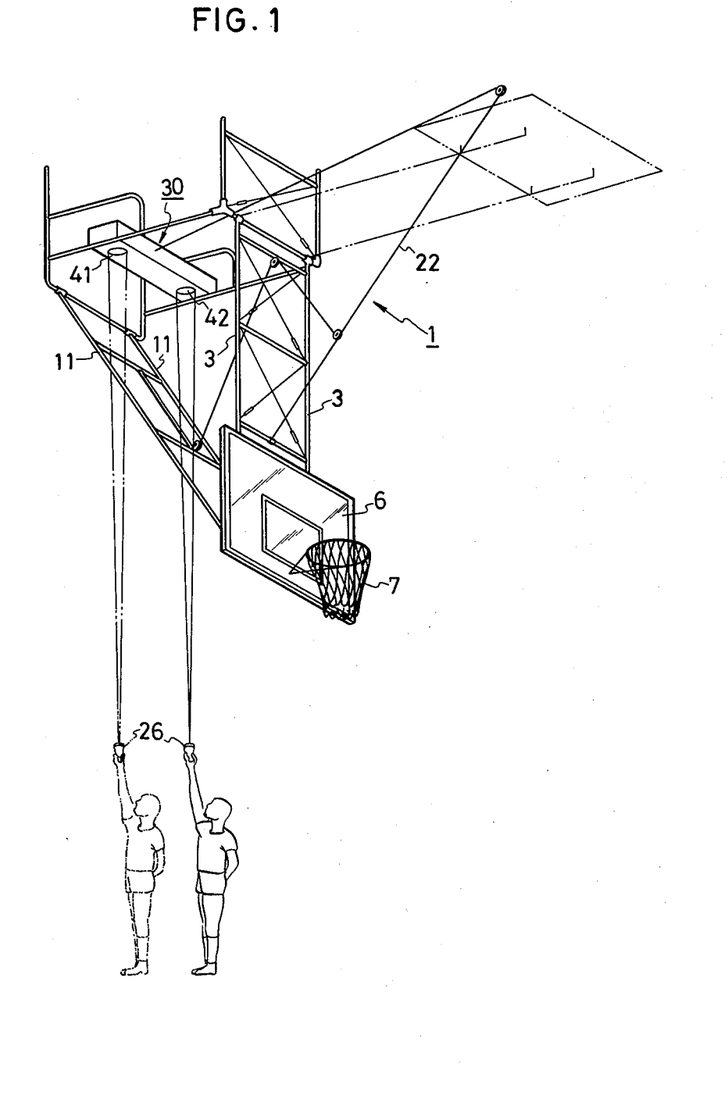
FIG. 1 is a perspective view showing a motor driven basketball backboard hanging mechanism with which the hoisting apparatus of the present invention is associated.

The present invention is contemplated for use in conjunction with a basketball backboard hanging mechanism as shown in FIGS. 1 and 2. While the basketball backboard hanging mechanism itself does not form a part of the present invention, it is illustrated to provide a point of reference for the present invention in a practical environment.

Figure 2A:
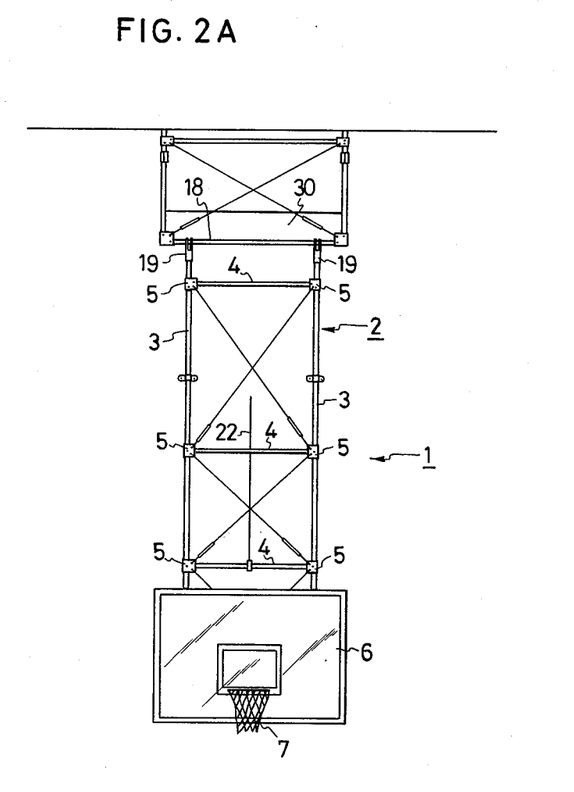
FIGS. 2A and 2B are elevational and side views of the mechanism of FIG. 1, FIGS. 2C and 2D are enlarged elevational and side views showing the guide roller unit employed in the mechanism.
Figure 2B:
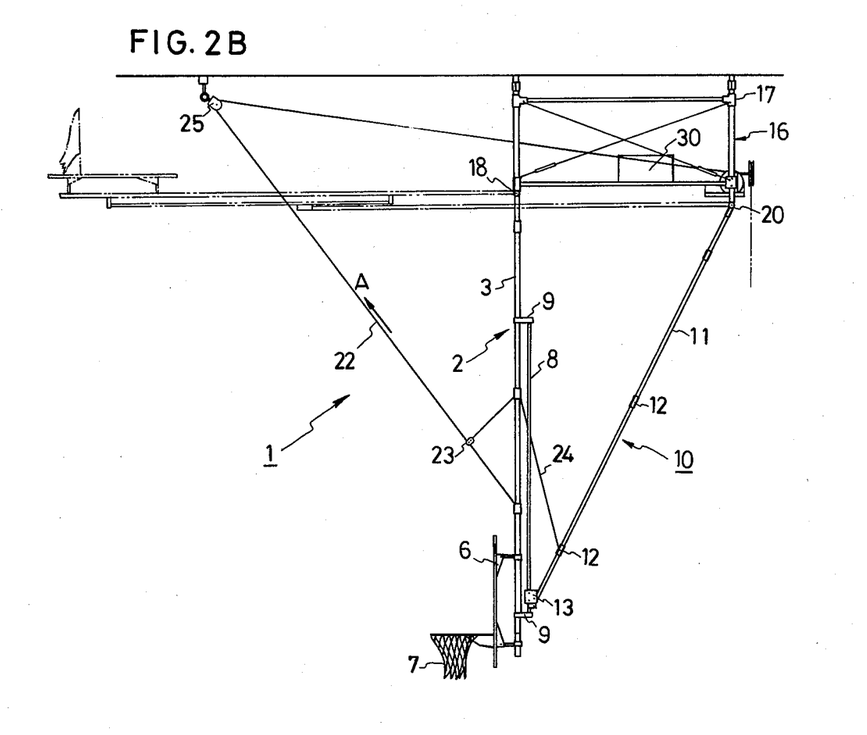
Figure 2C:
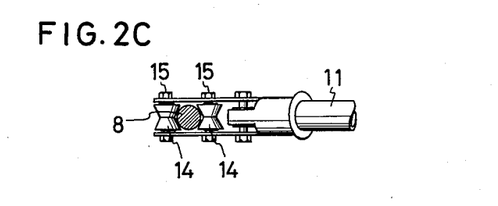
Figure 2D:
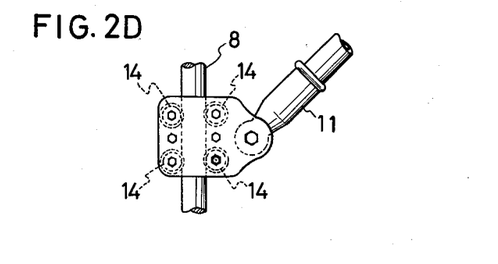

A basketball backboard hanging mechanism 1 is shown as including a first frame structure 2 composed of a pair of side members 3 extending vertically in spaced relation and cross bars 4 extending between the side members 3 in longitudinally spaced relation and secured at their opposite ends to the side members 3 by means of clamps 5. The first frame structure 2 supports at its lower portion a basketball backboard 6 provided centrally with a goal or basket 7. A guide rail 8 is attached by means of clamps 9 to the rear side of each of the side members 3. The mechanism 1 also includes a second frame structure 10 composed of a pair of stay members 11 extending in parallel spaced relation and cross bars 12 extending between the stay members 11 in longitudinally spaced relation. A slider 13 is provided at the lower end of each of the stay members 11 which is best shown in FIGS. 2C and 2D as including four rollers 14 journalled on respective shafts 15 such as to hold one of the guide rails 8 for sliding movement along it. The mechanism 1 further includes a third frame structure 16 of a rectangular parallelipiped shape which has upper ends 17 embedded in the ceiling of the gymnasium, a horizontal rod 18 to which the upper ends of the side members 3 of the first frame structure 2 are connected by pivotal connections 19, and another horizontal rod 20 to which the upper ends of the stay members 11 of the second frame structure 10 are connected by pivotal connections 21.

A wire rope 22 extends from one of the cross bars 4 to a pulley 23 and another wire rope 24 extends from one of the cross bars 12 through the pulley 23 and another pulley 25 hung from the ceiling to a hoisting drum (not shown) connected to an electric motor contained in an hoisting apparatus 30 as will be described later. When the electric motor is placed in operation to pull the wire rope 22 in the direction indicated by the arrow A, the first and second frame structures 2 and 10 rotate in the clockwise direction about their pivotal connections with the sliders 13 sliding along the respective guide rails 8 so that the first frame and second frame structures 2 and 10 are placed in a horizontal position as shown by the phantom lines of FIG. 2B. Such lifting of the basketball backboard 6 is accomplished by projecting a light beam for a predetermined time from a projector 26 to a first photosensitive element 41 as will be described in detail later as shown in FIG. 1. A light beam may be projected for a predetermined time from the projector 26 to a second photosensitive element 42 to be described later if the basketball backboard 6 is required to fall.

As noted above, the basketball backboard hanging aspects of the present disclosure do not constitute a portion of the inventive concept herein disclosed. For example, any mechanism may be used to support the basketball backboard for swinging movement.

Figure 3:
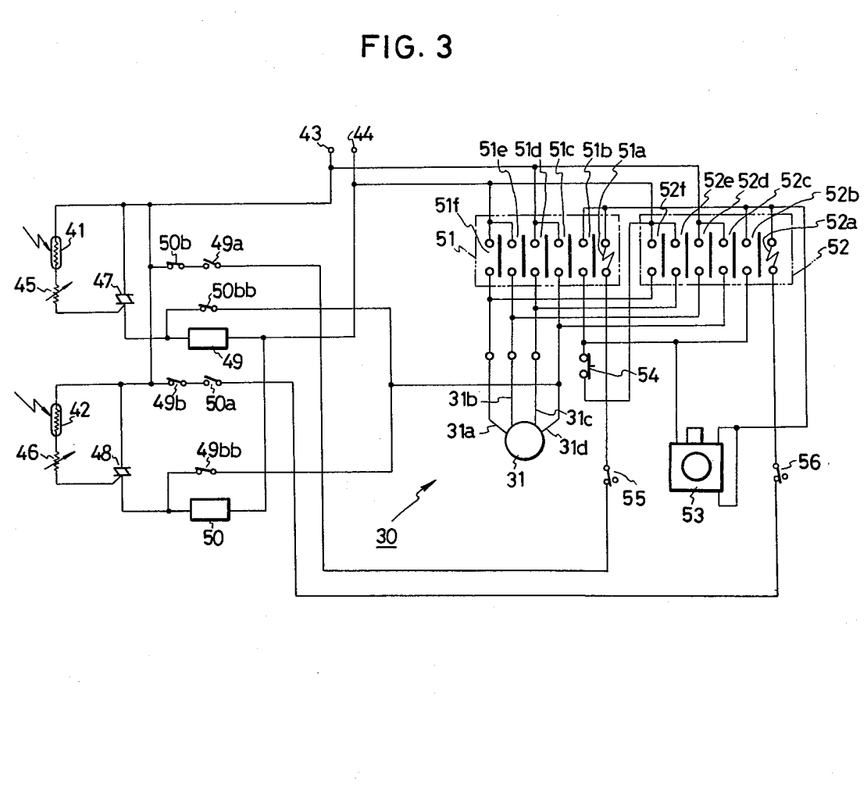
FIG. 3 is a circuit diagram showing the hoisting apparatus made in accordance with the present invention.

Referring now to FIG. 3, there is illustrated a hoisting apparatus designated generally by the reference numeral 30 and placed on the third frame structure 16 fixed to the ceiling of the gymnasium. The hoisting apparatus 30 comprises a reversible electric motor 31 drivingly connected to a hoisting drum (not shown) for winding and unwinding the wire rope 22. The electric motor 31 is driven through a control circuit. The control circuit comprises first and second photosensitive elements 41 and 42 such as photoconductive cells (CdS) or the like which are provided with a hood for shading unnecessary light beams. The first photosensitive element 41 has its one end connected to an AC power terminal 43 and the other end connected through a variable resistor 45 to the gate of a first bidirectional triode thyristor 47 (referred also to as a "triac"). The bidirectional thyristor 47 has its anode connected to the AC power terminal 43 and its cathode connected to one end of a first relay 49, the other end of which is connected to another AC power terminal 44. In a similar fashion, the second photosensitive element 42 has its one end connected to the AC power terminal 43 and the other end connected through a variable resistor 46 to the gate of a second bidirectional triode thyristor 48. The anode of the thyristor 48 is connected to the AC power terminal 43 and the cathode thereof is connected to one end of a second relay 50, the other end of which is connected to the AC power terminal 44. The first relay 49 is operable to close a normally open contact 49a and open normally closed contacts 49b and 49bb when energized. The second relay 50 is operable to close a normally open contact 50a and open normally closed contacts 50b and 50bb when energized.

The control circuit comprises first and second electromagnetic contactors 51 and 52. The first electromagnetic contactor 51 has an operating coil 51a and normally open contacts 51b to 51f, the normally open contact 51b serving as a self-holding contact. The second electromagnetic contactor 52 includes an operating coil 52a and normally open contacts 52b to 52f, the normally open contact 52b serving as a self-holding contact. The coil 51a of the first electromagnetic contactor 51 has its one end connected to the AC power terminal 44 through a timer circuit 53 and a thermal relay 54 and has the other end connected to the AC power terminal 43 through a first limit switch 55 and the series arrangement of the normally open contact 49a of the first relay 49 and the normally closed contact 50b of the second relay 50. The first limit switch 55 serves to cut off power to the coil 51a in response to the basketball backboard 6 rising to a first predetermined position.

The coil 52a of the second electromagnetic contactor 52 has its one end connected to the AC power terminal 44 through the timer circuit 53 and the thermal relay 54 and has the other end connected to the AC power terminal 43 through a second limit switch 56 and the series arrangement of the normally open contact 50a of the second relay 50 and the normally closed contact 49b of the first relay 49. The second limit switch 56 serves to cut off power to the coil 52a in response to the basketball backboard 6 falling to a second predetermined position.

The timer circuit 53 may be comprised of any conventional time delay circuit which serves to maintain the first or second electromagnetic contactor coil 51a or 52a deenergized a predetermined time (several seconds in this embodiment) after the first or second photosensitive element 41 or 42 is operated to energize the first or second relay 40 or 50, thereby preventing a malfunction such that the control circuit does not become operative to drive the motor 31 in response to any unspecified or unwanted light beam which may instantaneously become incident upon the first or second photosensitive element 41 or 42. Therefore, any extraneous unwanted light which impinges onto the photosensitive elements 41 or 42 is not effective to render motor 31 operative. The thermal relay 54 serves to deenergize the coil 51a or 52a when the temperature of the motor 31 increases above a predetermined level.

The reversible electric motor 31 has four terminals 31a to 31d. The terminals 31a and 31b are connected to the AC power terminal 44 through the normally open contacts 51f and 51e of the first electromagnetic contactor 51 and the terminals 31c and 31d connected to the AC power terminal 43 through the normally open contacts 51d and 51c thereof. Also, the terminals 31a and 31c of the electric motor 31 are connected to the AC power terminal 44 through the normally open contacts 52f and 52e of the second electromagnetic contactor 52 and the terminals 31b and 31d are connected to the AC power terminal 43 through the normally open contacts 52d and 52c thereof. Thus, the contacts 51c to 51f are closed to supply power to the electric motor 31 so as to rotate it in one direction to lift the basketball backboard when the first electromagnetic contactor 51 is energized, whereas the contacts 52c to 52f are closed to supply power to the electric motor 31 so as to rotate it in a reverse direction to lower the basketball backboard when the second electromagnetic contactor 52 is energized.

The normally closed contact 49bb is connected between the one end of the second relay 50 and the terminal 31d of the electric motor 31 for holding the second relay 50 energized until the second limit switch 56 is rendered operative and is opened to deenergize the second electromagnetic contactor 52. The normally closed contact 50bb is connected between the one end of the first relay 49 and the terminal 31d of the electric motor 31 for holding the first relay 49 energized until the first limit switch 55 becomes operative and is opened to deenergize the first electromagnetic contactor 51.

The operation of the hoisting apparatus of the present invention will now be described as it is used with a basketball backboard hanging mechanism as shown in FIGS. 1 and 2.

If the basketball backboard 6 is in its lower position, and it is required to rise to be moved away so as to permit the playing of another ball game, a continuous and sustained light beam may be continuously projected onto the first photosensitive element 41 from projector 26 for a predetermined length of time sufficient to overcome the delay imparted by the timer circuit 53, as shown by the phantom lines of FIG. 1. This causes a reduction in the resistance of the first photosensitive element 41 so as to render the first thyristor 47 conductive to energize the first relay 49. As a result, the normally open contact 49a is closed to form a closed circuit including the normally closed contact 50b, the normally open contact 49a, the first limit switch 55, the coil 51a of the first electromagnetic contactor 51, the timer circuit 53, and the thermal relay 54. Thus, the timer circuit 53 becomes conductive a predetermined time after the sustained actuation of the first photosensitive element 41 to close the circuit to and to energize the coil 51a so as to close the normally open contacts 51b to 51f thereby supplying power to the electric motor 31 for rotation thereof in one direction to lift or raise the basketball backboard 6 out of the way with the contact 51b holding this state. At this time, the first relay 49 is held in circuit in its energized condition through the contact 51c and the contact 5bb. When the basketball backboard 6 is lifted to and reaches a first predetermined position such as the horizontal position shown by the phantom lines of FIG. 2B, the first limit switch 55 detects this first predetermined position to break the closed circuit so that the first electromagnetic contactor 51 is deenergized to terminate the rotation of the electric motor 31.

On the other hand, when the basketball backboard 6 is in the horizontal position which is the same as the aforesaid first predetermined position and is required to fall for playing basketball, a sustained light beam may be continuously projected for the predetermined time from the projector 26 onto the second photosensitive element 42 as shown by the solid lines of FIG. 1. This causes a reduction in the resistance of the second photosensitive element 42 to render the second thyristor 48 conductive to energize the second relay 50. As a result, the normally open contact 50a is closed to form a closed circuit including the normally closed contact 49b, the normally open contact 50a, the second limit switch 56, the coil 52a of the second electromagnetic contactor 52, the timer circuit 53, and the thermal relay 54. Thus, the timer circuit 53, which includes the delay, becomes conductive a predetermined time after the sustained and continuous actuation of the second photosensitive element 42 to energize the coil 52a so as to close the normally open contacts 52b to 52f thereby supplying power to the electric motor 31 to rotate it in the reverse direction to lower the basketball backboard 6 with the contact 52b hold this state. The delay in timer circuit 53 also prevents the energization of coil 52a as a result of extraneous or unwanted light energy impinging onto the second photosensitive element 42. At this time, the second relay 50 is held through the contact 52c and the contact 49bb. When the basketball backboard 6 is lowered to a second position such as the vertical predetermined position shown by the solid lines of FIG. 2B, the second limit switch 56 detects the arrival of the backboard 6 into this position so as to break the closed circuit so that the second electromagnetic contactor 52 is deenergized to terminate the rotation of the electric motor 31.

With the above described hoisting apparatus, the basketball backboard can be securely hauled up or down merely by continuously projecting a light beam onto the first or second photosensitive element for a predetermined time. The hoisting apparatus cannot become operative in response to any instantaneous or undesired light beam becoming incident upon the photosensitive element because of the delay imparted as a result of the function of the timer circuit.

The hoisting apparatus also cannot be rendered operative in response to energization of both the photosensitive elements 41 and 42 simultaneously, as both normally closed contacts 49bb and 50bb would be opened. There is no need for any control board and wire cords connecting the control board and the apparatus. The hoisting apparatus of the present invention is simple, inexpensive, and easy to install.

Although the present invention has been described in connection with a hoisting apparatus for moving a basketball backboard into its usable position and to remove it therefrom, the hoisting apparatus fo the present invention can be used with other athletic game goals, nets and other objects which have to be removed or restored.

While the present invention has been described with reference to a preferred embodiment, it will be understood by those skilled in the art that various changes may be made and equivalents may be substituted for elements thereof without departing from the spirit and scope of the present invention.

We claim:

1. In a hoisting apparatus for moving an object, such as a piece of athletic equipment, between a first predetermined position and a second predetermined position, a reversible motor drivingly connected with the object, and a circuit for operating the motor in one direction of rotation to move the object from the first predetermined position to the second predetermined position and to reverse the operation of the motor to move the object from the second predetermined position to the first position, a source of power, first coupling means connecting the motor to the source of power of rotation of the motor in the one direction for movement of the object from the first position to the second position, and second coupling means connecting the motor to the source of power for reversing the rotation of the motor for movement of the object from the second position to the first position, the improvement comprising a first photosensitive energy responsive means interconnected between said motor and said first coupling means for electrically coupling said motor with said first coupling means in response to energization of said first energy responsive means by continuous light energy impinging thereon;

a second photosensitive energy responsive means independent of said first energy responsive means, said second energy responsive means being interconnected between said motor and said second coupling means for electrically coupling said motor with said second coupling means in response to the energization of said second energy responsive means by continuous light energy impinging thereon;

time delay means interconnected with said first and said second energy responsive means and said first and said second coupling means to delay the connection between said first coupling means and said motor and said second coupling means and said motor to assure connection of said motor with said first or said second coupling means solely in response to a sustained energization of said first or said second photosensitive energy responsive means; and, means responsive to the simultaneous energization of both said first photosensitive energy responsive means and said second photosensitive energy responsive means to isolate said motor from the source of power to render the hoisting apparatus inoperative.

2. In the hoisting apparatus as claimed in claim 1, including,
first and second limiting means coupled with said first and said second coupling means, respectively, said first and said second limiting means being responsive to said object reaching said first and said second predetermined positions, respectively, for rendering said first and said second coupling means inoperative to connect said motor to said power source.

3. In the apparatus as claimed in claim 1, wherein:
said first coupling means and said second coupling means each includes an operating coil in circuit with said time delay means, a normally open switch in circuit with said time delay means, and a plurality of normally open contacts when in their closed condition connecting said motor with said source of power and when in their open condition disconnecting said motor from said source of power and said normally open switch of each said first and said second coupling means being a self-holding contact.

4. In the apparatus as claimed in claim 3, including:
a thermal relay in circuit with both said self-holding contacts, said thermal relay being adapted to open upon the temperature of said motor reaching a predetermined temperature to deenergize the operating coils of said first and said second coupling means.

5. In the apparatus as claimed in claim 1, wherein said first coupling means includes:
a first switch means coupled to said motor and said time delay means for rotation of said motor in a first direction upon activation, and
a first relay means in circuit with said motor and said second coupling means; and,
said second coupling means includes:
a second switch means coupled to said motor and said time delay means for rotation of said motor in a direction reverse to said first direction upon activation, and
a second relay means in circuit with said first coupling means to disconnect said first switch means from said first photosensitive energy device upon energization of said second photosensitive energy device,
said first relay means controlling the connection of said motor with said first switch means and preventing connection to said second switch means.

6. In the apparatus as claimed in claim 5, wherein said first relay means includes a pair of normally closed contacts in circuit with said second photosensitive energy responsive device and said second switch means which upon energization of said first photosensitive energy responsive device is opened and decouples said second switch means from said second photosensitive energy responsive device, and a normally open contact in circuit between said first switch means and said first photosensitive energy responsive device to couple said first switch means through said time delay means to said first photosensitive energy responsive device; and
said second relay means includes a pair of normally closed contacts and a normally open contact, said last-mentioned normally closed contacts being in circuit with said first photosensitive energy responsive device and said first switch means and being opened upon energization of said second photosensitive device to decouple said first switch means from said first photosensitive device, said last-mentioned normally open contact being closed upon energization of said second photosensitive energy responsive device to couple said second switch means with said second photosensitive device through said time delay means.

7. In the apparatus as claimed in claim 5 including
an upper limit control switch in circuit with said first switch means to disconnect said first switch means and said motor for stopping thereof when said object reaches said first predetermined position, and
a lower limit control switch in circuit with said second photosensitive energy device and said second switch means to disconnect said second switch means and said motor for stopping thereof when said object reaches said second predetermined position.

8. In the apparatus as claimed in claim 5 or 6, including
means interconnected with said first and second coupling means responsive to the temperature of said electric motor and operable to decouple said first and said second coupling means from said motor when the temperature thereof is above a predetermined level.

9. In a hoisting apparatus for moving an object such as an athletic game goal between a first predetermined position and a second predetermined position a reversible motor drivingly connected with the object, and a circuit for operating the motor in one direction of rotation to move the object from the first predetermined position to the second predetermined position and to reverse the operation of the motor to move the object from the second predetermined position to the first position, a source of power, first coupling means connecting the motor to the source of power for rotation of the motor in the one direction for movement of the object from the first position to the second position, and second coupling means connecting the motor to the source of power for reversing the rotation of the motor for movement of the object from the second position to the first position,
the improvement comprising;
a first photosensitive energy responsive means interconnected between said motor and said first coupling means for electrically coupling said motor with said first coupling means in response to energization of said first energy responsive means by continuous light energy impinging thereon;
a second photosensitive energy responsive means independent of said first energy responsive means, said second energy responsive means being interconnected between said motor and said second coupling means for electrically coupling said energization of said second energy responsive means by continuous light energy impinging thereon;
time delay means interconnected with said first and said second energy responsive means and said first and said second coupling means to delay the connection between said first coupling means and said motor and said second coupling means and said motor to assure connection of said motor with said first or said second coupling means solely in response to a sustained energization of said first and said second photosensitive energy responsive means;

said first coupling means including a first switch means, coupled to said motor and said time delay means for rotation of said motor in a first direction upon activation and a first relay means in circuit with said motor and said second coupling means to control the connection of said motor with said first switch means, said second coupling means including a second switch means, coupled to said motor and said time delay means for rotation of said motor in a direction reverse to said first direction upon activation and a second relay means in circuit with said first coupling means to disconnect said first switch means from said first photosensitive energy device;

said first relay means including a pair of normally closed contacts in circuit with said second photosensitive energy responsive device and said second switch means which, upon energization of said first photosensitive energy responsive device, is opened and decouples said second switch means from said second photosensitive energy responsive device, and a normally open contact in circuit between said first switch means and said first photosensitive energy responsive device to couple said first switch means through said time delay means to said first photosensitive energy responsive device;

said second relay means including a pair of normally closed contacts and a normally open contact, said last-mentioned normally closed contacts being in circuit with said first photosensitive energy responsive device and said first switch means and being opened upon energization of said second photosensitive device to decouple said first switch means from said first photosensitive device: said last-mentioned normally open contact being closed upon energization of said second photosensitive energy responsive device to couple said second switch means with said second photosensitive device through said time delay means;

an upper limit control switch in circuit with said first switch means to disconnect said first switch means and said motor for stopping thereof when said object reaches said first predetermined position, a lower limit control switch in circuit with said second photosensitive energy device and said second switch means to disconnect said second switch means and said motor for stopping thereof when said object reaches said second predetermined position, and a thermal relay in circuit with both said self-holding contacts, said thermal relay being adapted to open upon the temperature of said motor reaching a predetermined temperature to deenergize the operating coils of said first and said second coupling means.

* * * * *

UNITED STATES PATENT AND TRADEMARK OFFICE
CERTIFICATE OF CORRECTION

PATENT NO. : 4,221,996
DATED : September 9, 1980
INVENTOR(S) : Motoi Shimizu et al It is certified that error appears in the above—identified patent and that said Letters Patent is hereby corrected as shown below:

Column 4, Line 14   change   "relay 40" to --relay 49--

Column 5, Line 19   change   "5bb" to --50bb--

Column 6, Line 14   change   "fo the" to --of the--

Signed and Sealed this

Tenth Day of March 1981

[SEAL]

Attest:

RENE D. TEGTMEYER

Attesting Officer     Acting Commissioner of Patents and Trademarks